(12) United States Patent
Cruz et al.

(10) Patent No.: US 11,240,015 B2
(45) Date of Patent: Feb. 1, 2022

(54) OPTICAL ENCRYPTION TERMINAL, CRYPTOGRAPHY KEY DISTRIBUTION SYSTEM AND METHOD OF GENERATING CRYPTOGRAPHY KEYS IN A CRYPTOGRAPHY KEY DISTRIBUTION SYSTEM

(71) Applicants: CUP Sciences, Inc., Long Beach, CA (US); The University Court of the University of St. Andrews, Fife (GB); King Abdullah University of Science and Technology, Jeddah (SA)

(72) Inventors: Aluizio M. Cruz, Paramount, CA (US); Andrea Fratalocchi, Jeddah (SA); Valerio Mazzone, Jeddah (SA); Andrea Di Falco, Fife (GB)

(73) Assignees: CUP Sciences, Inc., Long Beach, CA (US); The University Court of the University of St. Andrews, Fife (GB); King Abdullah University of Science and Technology, Jeddah (SA)

( * ) Notice: Subject to any disclaimer, the term of this patent is extended or adjusted under 35 U.S.C. 154(b) by 539 days.

(21) Appl. No.: 16/132,017

(22) Filed: Sep. 14, 2018

(65) Prior Publication Data

US 2020/0177376 A1 Jun. 4, 2020

(51) Int. Cl.
*H04L 9/08* (2006.01)
*G01N 21/47* (2006.01)
*G02B 6/42* (2006.01)

(52) U.S. Cl.
CPC .......... *H04L 9/0858* (2013.01); *G01N 21/47* (2013.01); *G02B 6/4293* (2013.01); *H04L 9/083* (2013.01)

(58) Field of Classification Search
CPC ..... H04L 9/0858; H04L 9/083; H04L 9/0838; H04L 9/0866; G01N 21/47; G02B 6/4293
See application file for complete search history.

(56) References Cited

U.S. PATENT DOCUMENTS 6,810,407 B1 * 10/2004 Jaques .................. G02F 1/3517
708/801
8,433,067 B2 * 4/2013 Nakagata ................ G09C 5/00
380/205

(Continued)

OTHER PUBLICATIONS

International Search Report and Written Opinion in Application No. PCT/EP2019/074746, dated Dec. 3, 2019, in 31 pages.

(Continued)

*Primary Examiner* — Mohammed Waliullah
(74) *Attorney, Agent, or Firm* — Knobbe, Martens, Olson & Bear, LLP

(57) ABSTRACT

In an aspect, the present invention provides an optical encryption terminal for generating and distributing a cryptographic key signal in a cryptography key distribution system having at least two optical encryption terminals. The optical encryption terminal comprises an electronic processing unit and the optical encryption terminal is configured to selectively receive optical input signals generated by a source of electromagnetic radiation and optical input signals generated by a further optical encryption terminal, and to selectively output first optical output signals to a detection element and second optical output signals to the further optical encryption terminal, wherein the first optical output signals are based on the optical input signals generated by the further optical encryption terminal and transformed in accordance with an optical encryption pattern provided at the optical encryption terminal. Furthermore, the optical encryption terminal is configured to determine, using the electronic processing unit, a cryptographic key signal on the (Continued)

basis of at least one radiometric and/or photometric quantity associated with the optical output signals detected by the detection element.

16 Claims, 12 Drawing Sheets

(56) References Cited

U.S. PATENT DOCUMENTS

2010/0272259 A1* 10/2010 Kim .................... H04L 63/162
                                                   380/256
2011/0058225 A1*  3/2011 Lee .................... H04N 1/444
                                                   358/3.28

OTHER PUBLICATIONS

Mazzone, Valerio, et al., "Ultra-fast secure communication with complex systems in classical channels (Conference Presentation)," Abstract, Proceedings of SPIE, ISSN 0277-786X vol. 10524, SPIE, US, vol. 10108, Apr. 28, 2017, 101080R, XP060088396, ISBN: 978-1-5106-1533-5.

Mazzone, Valerio, et al.: "Ultra-fast secure communication with complex sytems in classical channels", XP055644938, DOI: 10.1117/12.2251940; URL:http://dx.doi.org/10.1117/12.2251940.5393348501001; [retrieved on Nov. 21, 2019].

Menezes, Alfred J., et al., "Handbook of Applied Cryptography", Jan. 1, 1997, pp. 20, 21, 192, 193, 394, 395, 535, CRC Press Series on Discrete Mathematics and its Applications, CRC Press, Boca Raton, FL, XP002519947, ISBN: 978-0-8493-8523-0.

* cited by examiner

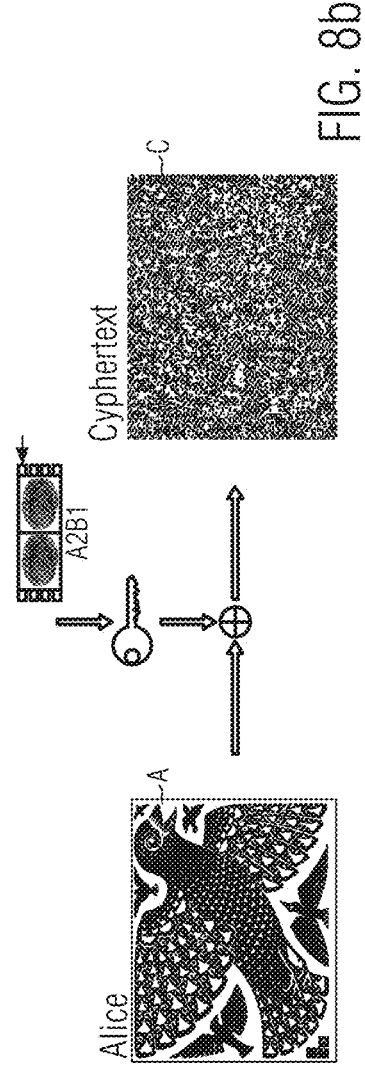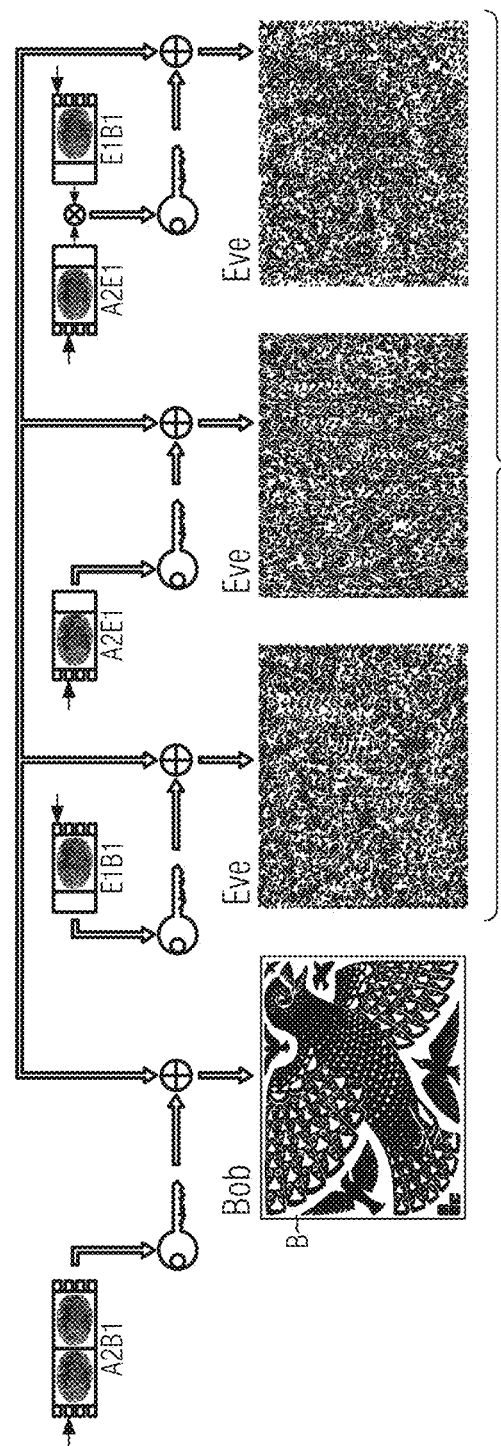
FIG. 8a
FIG. 8b
FIG. 8c
FIG. 8d

OPTICAL ENCRYPTION TERMINAL, CRYPTOGRAPHY KEY DISTRIBUTION SYSTEM AND METHOD OF GENERATING CRYPTOGRAPHY KEYS IN A CRYPTOGRAPHY KEY DISTRIBUTION SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure generally relates to optical encryption and, particularly, to generation and distribution of cryptographic key signals in cryptography key distribution systems.

Description of the Related Art

Cryptography is the study of techniques for developing secure communications in the presence of third parties, known as adversaries. Generally, cryptographic schemes show two main components: a message to be sent and a cipher representing an algorithm that is applied and inverted to encode and decode the message, respectively.

Modern cryptographic techniques are based on ciphers that are increasingly difficult to invert without a key, which represents additional information in the form of a string of characters and/or numbers that has to be possessed by both parties sharing encrypted information.

With advancing digitalization in many fields of the everyday life employing digital data (i.e. the internet, and the Internet of Things IoT) as an increasingly dominant element of communication and commerce between different parties, devices and objects, there is a constant need for reliable tools which allow different parties to exchange sensitive information without being intercepted by third parties. Obviously, a keyed communication between two parties can only be considered secure as long as the cipher is only and exclusively known to the parties in communication. Furthermore, as the key must be known to the parties in communication beforehand, the key must be distributed among the parties in the communication in a secure manner without giving third parties (i.e., at least one eavesdropper) the opportunity to intercept a distributed key.

It is therefore desirable to provide parties (individual users, computers, personal electronic devices, networked objects and appliances) with means for generating and distributing encryption keys that cannot be cloned or intercepted by any type of eavesdropper.

SUMMARY OF THE INVENTION

The following presents a simplified summary of the disclosure in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In a first aspect of the present invention, an optical encryption terminal for generating and distributing a cryptographic key signal in a cryptography key distribution system is provided, the cryptography key distribution system having at least two optical encryption terminals. In accordance with some illustrative embodiments of the present invention, the optical encryption terminal comprises an electronic processing unit, wherein the optical encryption terminal is configured to selectively receive first optical input signals generated by a source of electromagnetic radiation and second optical input signals generated by a further optical encryption terminal, and to selectively output first optical output signals to a detection element and second optical output signals to the further optical encryption terminal, the first optical output signals being based on the second optical input signals being transformed in accordance with an optical encryption pattern provided at the optical encryption terminal. Furthermore, the optical encryption terminal is configured to determine, using the electronic processing unit, a cryptographic key signal on the basis of at least one radiometric and/or photometric quantity associated with the first optical output signals detected by the detection element.

In a second aspect of the present invention, a cryptography key distribution system is provided, comprising: a first optical encryption terminal configured to transform optical input signals into optical output signals in accordance with a first optical encryption pattern provided at the first optical encryption terminal; a second optical encryption terminal configured to transform optical input signals into optical output signals in accordance with a second optical encryption pattern provided at the second optical encryption terminal, the first and second optical encryption terminals being optically coupled so as to mutually exchange optical output signals; a first source of electromagnetic radiation configured to provide the first optical encryption terminal with first input signals of electromagnetic radiation; a second source of electromagnetic radiation configured to provide the second optical encryption terminal with second input signals of electromagnetic radiation; a first detection element configured to detect at least one first radiometric and/or photometric quantity associated with first optical output signals of the first optical encryption terminal, the first optical output signals being based on the second input signals being successively transformed by the second and first optical encryption terminals; a second detection element configured to detect at least one second radiometric and/or photometric quantity associated with second optical output signals of the second optical encryption terminal, the second optical output signals being based on the first input signals being successively transformed by the first and second optical encryption terminals; a first electronic processing unit coupled to the first detection element, the first electronic processing unit being configured to determine a first cryptographic key signal on the basis of at least one first radiometric and/or photometric quantity detected by the first detection element; and a second electronic processing unit coupled to the second detection element, the second electronic processing unit being configured to determine a second cryptographic key signal on the basis of at least one second radiometric and/or photometric quantity detected by the second detection element.

In a third aspect of the present invention, a method of generating cryptographic key in a cryptography key distribution system having a first optical encryption terminal and a second optical encryption terminal is provided, the method comprising: providing the first optical encryption terminal with electromagnetic radiation of a first source of electromagnetic radiation as first optical input signals, transforming the first optical input signals into first optical output signals in accordance with a first optical encryption pattern formed at the first optical encryption terminal, providing the second optical encryption terminal with the first optical output signals as second optical input signals, transforming the second optical input signals into second optical output signals in accordance with a second optical encryption pattern formed at the second optical encryption terminal, detecting at least one first radiometric and/or photometric quantity associated with the second optical output signals, and determining a first cryptographic key on the basis of the at least one detected first radiometric and/or photometric quantity.

BRIEF DESCRIPTION OF THE DRAWINGS

Further effects and advantages will be apparent from the following detailed description in combination with the accompanying drawings, wherein:

FIGS. 8a, 8b, 8c, and 8d shows an illustrative process of encrypting and decrypting data in a cryptography key generation and distribution system in accordance with some illustrative embodiments of the present disclosure;

Figure 1:
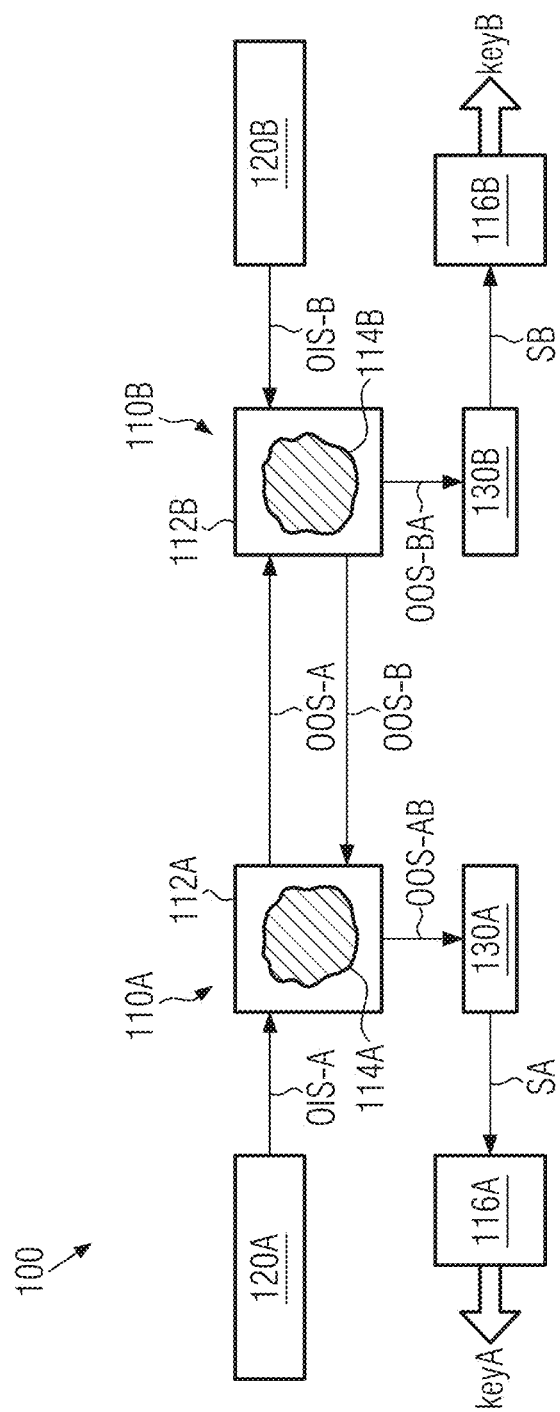
FIG. 1 schematically illustrates a cryptography key distribution system in accordance with some illustrative embodiments of the present invention.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios and numerical properties of ingredients, reaction conditions and so forth used in the specification and claims are to be understood as being modified in all instances by the term "about."

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to the above described first to third aspects of the present disclosure, some illustrative embodiments of the present disclosure will be described in greater detail.

After a complete lecture of the present disclosure, the person skilled in the art will appreciate that the optical encryption terminal of the first aspect may allow for generating and distributing a cryptographic key signal in a cryptography key distribution system between two optical encryption terminals where, on the basis of optical signals exchanged between the two optical encryption terminals of the cryptography key distribution system, a cryptographic key is generated and shared between two parties in communication via the optical encryption terminals. Herein, the generated and shared cryptographic key may be completely generated only after a signal is subjected to the action of the optical encryption terminals in communication. Accordingly, an eavesdropper may not intercept the cryptographic key that is not completely generated in a communication path between the two communicating parties. It is only the combined action of two optical encryption terminals in optical communication on the basis of which the complete cryptographic key signal may be determined.

In accordance with some illustrative embodiments of the first aspect, the optical encryption pattern may comprise a plurality of regions of a first material randomly arranged in a second material, wherein the first and second materials differ in at least one optical characteristic from each other.

Accordingly, an optical encryption of exchanged optical signals may be provided, increasing the level of security of cryptographic key signals to be generated and distributed in a cryptography key distribution system employing at least two optical encryption terminals of the first aspect.

In accordance with some further advantageous examples herein, the first material may have a greater absorptive and/or transmissive and/or diffractive characteristic with regard to the electromagnetic radiation than the second material.

Accordingly, an easy and cheap way of implementing the optical encryption pattern in the optical encryption terminal may be provided.

In accordance with other advantageous embodiments herein, the plurality of regions of the first material may be arranged in accordance with a predefined pattern, such as a user individual pattern, e.g. a fingerprint of a user of the optical encryption terminal. Accordingly, upon using for instance the fingerprint of a user, a unique optical encryption pattern may be implemented.

In accordance with some other illustrative embodiments of the first aspect, the optical encryption pattern may be formed in a photonic nanostructure.

By means of photonic nanostructures employing random and/or chaotic scattering components, optical encryption patterns for multi use may be realized in an easy and inexpensive way. Alternatively, optical encryption patterns for single use may be, for example, realized by temporary scattering components, that is, scattering components that maintain a certain scattering behavior only for a certain time interval long enough that a single cryptographic key may be generated at each of the first and second encryption terminals, i.e., a time scale on which electromagnetic radiation travels back and forth between the first and second encryption terminals.

In accordance with some advantageous embodiments herein, the photonic nanostructures may for example be realized in silicon on insulator technology, where light is confined on the plane of the chip via total internal reflection. In accordance with some special illustrative examples, the scattering components may be obtained by drilling holes in the silicon top layer, with diameters comprised between 0.1*lambda and lambda, where lambda is the wavelength of light in the medium (e.g. in the C and L band, i.e. wavelength range from 1530 nm to 1625 nm). The top surface of the chip and the holes can be left uncoated, or coated with other materials, like polymers (e.g. PMMA, SU8) or dielectric layers (e.g. $SiO_2$) for robustness and packaging requirements. Other embodiments can be realized in random scattering materials, including high refractive contrast semiconductors (e.g. including also GaAs, GaP, $Si_3N_4$, InP, etc.), treated to scatter light randomly in or out of the plane of the chip, or colloidal solutions of strongly scattering particles with dimensions comprised between 0.1*lambda and lambda (e.g. particles made of metal, alumina, $TiO_2$, silicon, etc.) in a polymeric matrix (e.g. PMMA, Polymide, SU8, PDMS, etc.). Additionally, or alternatively, the optical encryption pattern can be realized in biomaterials or by using directly human interfaces, such as, e.g., human fingerprints or retinas.

With regard to the second aspect, the accordingly provided cryptography key distribution system may allow for generating and distributing cryptographic key signals between first and second optical encryption terminals where, on the basis of optical signals exchanged between the first and second optical encryption terminals of the cryptography key distribution system, first and second cryptographic key signals are generated and shared between two parties in communication via the first and second optical encryption terminals. Herein, the generated and shared first and second cryptographic key signals may be completely generated only after a signal is subjected to the action of both, the first and second optical encryption terminals in communication. Accordingly, an eavesdropper may not intercept the first and second cryptographic key signals which may only be determined after the combined action of first and second optical encryption terminals in optical communication is known.

In accordance with some illustrative embodiments of the second aspect, each of the first and second optical encryption patterns may comprise a plurality of regions of a first material arranged in a second material in accordance with a predefined pattern, wherein the first and second materials differ in at least one optical characteristic from each other.

Accordingly, an optical encryption of exchanged optical signals may be provided, increasing the level of security of cryptographic key signals to be generated and distributed in the cryptography key distribution system.

In accordance with some further advantageous examples herein, the first material may have a greater absorptive and/or transmissive and/or diffractive characteristic with regard to the electromagnetic radiation than the second material.

Accordingly, an easy and cheap way of implementing the first and second optical encryption patterns may be provided.

In accordance with other advantageous embodiments herein, the plurality of regions of the first material may be arranged in accordance with a fingerprint of a user of the first or second optical encryption terminals.

Accordingly, upon using the fingerprint of a user, a unique optical encryption pattern may be implemented.

In accordance with some other illustrative embodiments of the second aspect, each of the first and second optical encryption patterns may be formed in a photonic nano structure.

By means of photonic nanostructures, each of the first and second optical encryption patterns may be realized in an easy and inexpensive way.

In accordance with some advantageous embodiments herein, the photonic nanostructures may for example be realized in silicon on insulator technology, where light is confined on the plane of the chip via total internal reflection. The scattering components are obtained by drilling holes in the silicon top layer, with diameters comprised between 0.1*lambda and lambda, where lambda is the wavelength of light in the medium. The top surface of the chip and the holes can be left uncoated, or coated with other materials, like polymers (e.g. PMMA, SU8) or dielectric layers (e.g. SiO2) for robustness and packaging requirements. Other embodiments can be realized in random scattering materials, including high refractive contrast semiconductors (e.g. including also GaAs, GaP, Si3N4, InP, etc.), treated to scatter light randomly in or out of the plane of the chip, or colloidal solutions of strongly scattering particles with dimensions comprised between 0.1*lambda and lambda (e.g. particles made of metal, alumina, TiO2, silicon, etc.) in polymeric matrix (e.g. PMMA, Polymide, SU8, PDMS, etc.). The optical encryption pattern can also be realized in biomaterials or by using directly human interfaces, such as, e.g., human fingerprints or retinas.

With regard to the third aspect, the accordingly provided method may allow for generating cryptographic keys in a cryptography key generation and distribution system, where the first cryptographic key is generated at the first optical encryption terminal on the basis of optical signals exchanged between the first and second optical encryption terminals of the cryptography key distribution system between two parties in communication via the first and second optical encryption terminals. Herein, the generated first cryptographic key may be completely generated only after a signal is subjected to the action of both, the first and second optical encryption terminals in communication. Accordingly, an eavesdropper may not intercept the first cryptographic key which is only determined at the first optical encryption terminal.

In accordance with some illustrative embodiments herein, the method may further comprise: providing the second optical encryption terminal with electromagnetic radiation of a second source of electromagnetic radiation as third optical input signals, transforming the third optical input signals into third optical output signals in accordance with the second optical encryption pattern, providing the first optical encryption terminal with the third optical output signals as fourth optical input signals, transforming the fourth optical input signals into fourth optical output signals in accordance with the first optical encryption pattern, detecting at least one second radiometric and/or photometric quantity associated with the fourth optical output signals, and determining a second cryptographic key on the basis of the at least one detected second radiometric and/or photometric quantity.

In accordance with some advantageous embodiments herein, the first and second cryptographic keys may be identical upon the electromagnetic radiation of the first and second sources of electromagnetic radiations providing identical optical input signals.

The present disclosure will now be described with reference to the attached figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

In the following detailed description, at least some illustrative embodiments of the above described first to third aspects of the present disclosure will be described in combination with the Figures in greater detail.

FIG. 1 schematically illustrates a cryptography key distribution system 100 in accordance with some illustrative embodiments of the present disclosure. The cryptography key distribution system 100 comprises a first optical encryption terminal 110A and a second optical encryption terminal 110B, each of which being configured to transform optical input signals into optical output signals.

As depicted in FIG. 1, the first optical encryption terminal 110A may comprise a first optical pad 112A with a first optical encryption pattern 114A that may be provided at the first optical encryption terminal 110A. In accordance with some illustrative examples herein, the first optical encryp-tion pattern 114A may be provided by a first optical scattering and/or diffraction pattern that is provided at the first optical pad 112A. In accordance with some special illustrative examples herein, the first optical encryption pattern 114A may be permanently formed in the optical pad 112A, e.g., the first optical scattering and/or diffraction pattern may be formed in the first optical pad 112A by etching, cutting, scratching, etc. a targeted or desired pattern into the first optical pad 112A. The first optical scattering and/or diffraction pattern may be formed as a photonic nano structure, exemplary fabrication of which is explained above.

Alternatively, the first optical encryption pattern 114A may be temporarily formed during time, the cryptography key distribution system 100 is employed for generating and distributing a cryptographic key. For example, a user of the first optical encryption terminal 110A may temporarily couple the first optical encryption pattern 114A with the first optical encryption terminal 110A at least during the time when at least one cryptographic key is to be generated and/or distributed in the cryptography key distribution system 100. Some illustrative and non-limiting examples of implementations of the first optical encryption pattern will be described with regard to FIGS. 6 and 7 below.

In accordance with some illustrative embodiments of the present disclosure, the second optical encryption terminal 110B may comprise a second optical pad 112B with a second optical encryption pattern 114B that may be provided at the second optical encryption terminal 110B. In accordance with some illustrative examples herein, the second optical encryption pattern 114B may be provided by a second optical scattering and/or diffraction pattern that may be provided at the second optical pad 112B similarly to the first optical encryption pattern 114A at the first optical pad 112A. In accordance with some special illustrative examples herein, the second optical encryption pattern 114B may be permanently formed in the second optical pad 112B, e.g., the second optical scattering and/or diffraction pattern may be formed in the second optical pad 112B by etching, cutting, scratching, etc. a targeted or desired pattern into the second optical pad 112B. Alternatively, the second optical encryption pattern 114B may be temporarily formed at least during the time the cryptography key distribution system 100 is employed for generating and distributing a cryptographic key. For example, a user of the second optical encryption pattern 114B may temporarily couple the second optical encryption pattern 114B with the second optical encryption terminal 110BA at least during the time when at least one cryptographic key is to be generated and/or distributed in the cryptography key distribution system 100. Some illustrative and non-limiting examples of implementations of the second optical encryption pattern 114B will be described with regard to FIGS. 6 and 7 below.

In accordance with some illustrative embodiments of the present disclosure, a first source 120A of electromagnetic radiation may be provided, the first source 120A of electromagnetic radiation being configured to provide first input signals OIS-A of electromagnetic radiation to the first optical pad 112A. In accordance with some illustrative embodiments of the present disclosure, the first source 120A of electromagnetic radiation may be an integral element of the first optical encryption terminal 110A. This does not pose any limitation on the present disclosure and, alternatively, the first source 120A of electromagnetic radiation may be provided as an exterior element with regard to the first optical encryption terminal 110A. For example, the first source 120A may be temporarily coupled to the first optical encryption terminal 110A during the time when at least one cryptographic key is generated in the cryptography key distribution system 100.

In accordance with some illustrative embodiments of the present disclosure, the first input signals OIS-A of electromagnetic radiation output by the first source 120A of electromagnetic radiation may be optically coupled with the first optical pad 112A so as to provide the first input signals OIS-A as optical input signals to the first optical pad 112A. Accordingly, the person skilled in the art will appreciate that the first optical encryption terminal 110A may have at least one input channel (not illustrated) by means of which electromagnetic radiation emitted by the first source 120A of electromagnetic radiation may be optically coupled to the first optical encryption terminal 110A when the first source 120A is not an integral part of the first optical encryption terminal 110A. For example, the first optical pad 112A may have at least one input channel (not illustrated) by means of which electromagnetic radiation emitted by the first source 120A of electromagnetic radiation may be optically input into the first optical pad 112A.

In accordance with some illustrative embodiments of the present invention, a first detection element 130A may be provided, the first detection element 130A being configured to detect at least one first radiometric and/or photometric quantity of first optical output signals OOS-AB that are output by the first optical pad 112A towards the first detection element 130A.

The person skilled in the art will appreciate that a first radiometric quantity may represent a sum of radiation quantities at various wavelengths (k), while a first photometric quantity may be represented by a weighted sum of radiation quantities at various wavelengths, a weighting factor defining a weight of the weighted sum in accordance with photopic or scotopic spectra luminous efficiency functions. Generally, radiometric and/or photometric quantities may be based on at least one of a luminous flux, a luminous intensity, a luminance, and an illuminance of the first optical output signals OOS-AB. Radiometric and photometric quantities are related by the following equation:

$$X_v = X_e * V(\lambda) * K_m,$$

where $X_v$ denotes a photometric quantity, $X_e$ denotes a radiometric quantity, $V(\lambda)$ denotes a spectral luminous efficiency and the factor $K_m$ denotes an efficiency factor, e.g., $K_m$ of red light may be about 683 lm/W, $K_m$ of green light may be about 683.1 lm/W, and $K_m$ of blue light may be about 68.3 lm/W.

In accordance with some illustrative embodiments of the present invention, the first detection element 130A may be provided as an integral element of the first optical encryption terminal 110A. In accordance with alternative embodiments of the present invention, the first detection element 130A may be an exterior element to the first optical encryption terminal 110A, the first detection element 130A being optically coupled to the first optical encryption terminal 110A so as to receive first optical output signals OOS-AB of the first optical pad 112A and to detect at least one first radiometric and/or photometric quantity associated with the first optical output signals OOS-AB of the first optical pad 112A, the first optical output signals OOS-AB being based on optical input signals which are received by the first optical encryption terminal 112A as optical signals output by the second optical encryption terminal 112B towards the first optical encryption terminal 110A.

In accordance with some illustrative embodiments of the present invention, results of detections of at least one first radiometric and/or photometric quantity obtained by the first detection element 130A may be output as first measurement signals SA to a first electronic processing unit 116A. In accordance with some illustrative examples herein, the first electronic processing unit 116A may be an integral element of the first optical encryption terminal 110A, the first electronic processing unit 116A being configured to determine a first cryptographic key signal keyA on the basis of the at least one first radiometric and/or photometric quantity provided to the first electronic processing unit 116A via the first measurement signals SA.

Now, reference is made to the second optical encryption terminal 110B. In accordance with some illustrative embodiments of the present disclosure, a second source 120B of electromagnetic radiation may be provided, the second source 120B of electromagnetic radiation being configured to provide second input signals OIS-B of electromagnetic radiation to the second optical pad 112B. In accordance with some illustrative embodiments of the present disclosure, the second source 120B of electromagnetic radiation may be an integral element of the second optical encryption terminal 110B. This does not pose any limitation on the present disclosure and, alternatively, the second source 120B of electromagnetic radiation may be provided as an exterior element with regard to the second optical encryption terminal 110B. For example, the second source 120B may be temporarily coupled to the second optical encryption terminal 110B during the time when at least one cryptographic key is generated and/or distributed in the cryptography key distribution system 100.

In accordance with some illustrative embodiments of the present disclosure, the second input signals OIS-B of electromagnetic radiation output by the second source 120B of electromagnetic radiation may be optically coupled with the second optical pad 112B so as to provide the second input signals OIS-B as optical input signals to the second optical pad 112B. Accordingly, the person skilled in the art will appreciate that the second optical encryption terminal 110B may have at least one input channel (not illustrated) by means of which electromagnetic radiation emitted by the second source 120B of electromagnetic radiation may be optically coupled to the second optical encryption terminal 110B when the second source 120B is not an integral part of the second optical encryption terminal 110B. For example, the second optical pad 112B may have at least one input channel (not illustrated) by means of which electromagnetic radiation emitted by the second source 120B of electromagnetic radiation may be optically input into the second optical pad 112B.

In accordance with some illustrative embodiments of the present invention, a second detection element 130B may be provided, the second detection element 130B being configured to detect at least one second radiometric and/or photometric quantity of second optical output signals OOS-BA that are output by the second optical pad 112B towards to the second detection element 130B.

In accordance with some illustrative embodiments of the present disclosure, the first and second detection elements 130A and 130B are of the same type. For example, the first and second detection elements 130A and 130B may have equal resolutions, relative amplitudes, and the like.

The person skilled in the art will appreciate that a second radiometric quantity may represent a sum of radiation quantities at various wavelengths (k), while a second photometric quantity may be represented by a weighted sum of radiation quantities at various wavelengths, a weighting factor defining a weight of the weighted sum in accordance with photopic or scotopic spectra luminous efficiency functions. Generally, radiometric and/or photometric quantities may be based on at least one of a luminous flux, a luminous intensity, a luminance, and an illuminance of the second optical output signals OOS-BA.

In accordance with some illustrative embodiments of the present invention, the second detection element 130B may be provided as an integral element of the second optical encryption terminal 110B. In accordance with alternative embodiments of the present invention, the second detection element 130B may be an exterior element to the second optical encryption terminal 110B, the second detection element 130B being optically coupled to the second optical encryption terminal 110B so as to receive second optical output signals OOS-BA of the second optical pad 112B and to detect at least one second radiometric and/or photometric quantity associated with the second optical output signals OOS-BA of the second optical pad 112B, the second optical output signals OOS-BA being based on optical input signals which are received by the second optical encryption terminal 112B as optical signals output by the first optical encryption terminal 112A towards the second optical encryption terminal 110B.

In accordance with some illustrative embodiments of the present invention, results of detections of at least a second radiometric and/or photometric quantity obtained by the second detection element 130B may be output as second measurement signals SB to a second electronic processing unit 116B. In accordance with some illustrative examples herein, the second electronic processing unit 116B may be an integral element of the second optical encryption terminal 110B, the second electronic processing unit 116B being configured to determine a second cryptographic key signal keyB on the basis of the at least one second radiometric and/or photometric quantity provided to the second electronic processing unit 116B via the second measurement signals SB.

After a complete reading of the present disclosure, the person skilled in the art will appreciate that the cryptography key distribution system 100, as depicted in FIG. 1, may comprise the first and second optical encryption terminals 110A, 110B which are optically coupled so as to mutually exchange optical output signals, as it is schematically indicated in FIG. 1 by means of the signals OOS-A and OOS-B. Particularly, electromagnetic radiation as provided by the first source of electromagnetic radiation 120A, may be transformed by the first optical encryption terminal 110A into the optical output signals OOS-A of the first encryption terminal 110A. The optical output signals OOS-A of the first optical encryption terminal 110A may be provided to the second optical encryption terminal 110B as optical input signals which are transformed into optical output signals by the second encryption pattern 114B of the second optical encryption terminal 110B towards the second detection element 130B. Particularly, electromagnetic radiation generated by the first source 120A of electromagnetic radiation may be successively transformed by the first optical encryption pattern 114A of the first optical encryption terminal 112A and the second optical encryption pattern 114B of the second option encryption terminal 112B, prior to being detected by the second detection element 130B.

Furthermore, electromagnetic radiation of the second source 120B of electromagnetic radiation may be detected by the first detection element 130A after being successively transformed by the second optical encryption pattern 114B of the second optical encryption terminal 110B and the first optical encryption pattern 114A of the first option encryption terminal 112A. Accordingly, optical key signals may be exchanged between the first and second optical encryption terminals 112A, 112B, resulting in the exchange of cryptographic key signals keyA and keyB at the first and second optical encryption terminals 110A, 110B.

In accordance with some illustrative and non-limiting examples of the present invention, the first and/or second detection elements may be implemented by means of charge coupled devices (CCDs), photoconductive detectors, such as photodiodes and phototransistors, and the like.

In accordance with some illustrative and non-limiting examples of the present invention, the first and/or second electronic processing units may be implemented by means of a computing device, such as a central processing unit (CPU) and the like.

In accordance with some illustrative and non-limiting examples of the present disclosure, the first and second optical encryption terminals 110A, 110B may be optically coupled by means of at least one optic fiber, e.g., a mono mode fiber, a multi mode fiber, and the like. For example, an optical fiber may have a core width of 10 micrometers or less, e.g., in a range from about 1 micrometer to about 10 micrometers, such as about 7 micrometers, and a cladding thickness of 125-150 micrometers.

In accordance with some illustrative and non-limiting examples of the present disclosure, the source could either be a broadband signal generated amplifying in the C+L band a diode via amplified spontaneous emission or by a tunable signal frequency laser in the standard telecommunication C+L band.

In accordance with some illustrative and non-limiting examples of the present disclosure, the optical fiber may be directly coupled to at least one of the optical encryption terminals 110A, 110B, that is, collimating optics may be avoided when coupling the optical fiber with at least one of the optical encryption terminals 110A, 110B. In some special illustrative example herein, the at least one of the optical detection elements 130A, 130B may comprise a fiber spectrum analyzer.

In accordance with some illustrative embodiments of the present disclosure, a method of generating a cryptographic key in accordance with some illustrative embodiments of the present disclosure will be described with regard to the cryptography key distribution system 100 of 1 in combination with the process flow depicted in FIG. 2a.

In accordance with some illustrative embodiments herein, the first optical encryption terminal 110A may be provided with electromagnetic radiation of the first source 120A of electromagnetic radiation (c.f. step S210 in FIG. 2a) as first optical input signals OIS-A.

The first optical input signals OIS-A may be transformed into first optical input signals OOS-A in accordance with the first optical encryption pattern 114A, which is formed at the first optical encryption terminal 110A (c.f. S215 in FIG. 2a).

The second optical encryption terminal 110B may be provided with the first optical input signals OOS-A as second optical input signals (c.f. S220 in FIG. 2a). The second optical input signals may be transformed into second optical output signals OOS-BA in accordance with the second optical encryption pattern 114B which is formed at the second optical encryption terminal 110B (c.f. S225 in FIG. 2a).

At least one first radiometric and/or photometric quantity associated with the second optical output signals OOS-BA may be detected by means of the second detection element 130B (c.f. S230 in FIG. 2a).

As schematically illustrated in FIG. 1, the second detection element 130B may provide the detected radiometric and/or photometric quantity or quantities as electronic measurement signals SB to the second electronic processing unit 116B.

The first cryptographic key signal keyB may be determined on the basis of the at least one first radiometric and/or photometric quantity provided to the second processing unit 116B via the electronic measurement signals SB (c.f. S235 in FIG. 2a).

With regard to FIG. 2b, a method of generating another cryptographic key in accordance with some illustrative embodiments of the present disclosure will be described with regard to the cryptography key distribution system 100 of 1 in combination with the process flow depicted in FIG. 2a.

In accordance with some illustrative embodiments of the present disclosure, the second optical pad 112B of the second optical encryption terminal 110B may be provided with electromagnetic radiation of the second source 120B of electromagnetic radiation as third optical input signals OIS-B (c.f. S240 in FIG. 2b).

The third optical input signals may be transformed into third optical output signals OOS-B of the second optical encryption terminal 110B towards the first optical encryption terminal 110A in accordance with the second optical encryption pattern 114B of the second optical encryption terminal 110B (c.f. S245 in FIG. 2b).

The first optical encryption terminal 110A may be provided with the third optical output signals OOS-B of the second optical encryption terminal 110B as fourth input signals to the first optical encryption terminal 110A (c.f. S250 in FIG. 2b).

The fourth optical input signals may be transformed into fourth optical output signals OOS-AB in the first optical encryption terminal 110A in accordance with the first optical encryption pattern 114A (c.f. S255 in FIG. 2b).

The fourth optical output signals OOS-AB of the first optical pad 112A of the first optical encryption terminal 110A may be received by the first detection element 130A and at least one second radiometric and/or photometric quantity associated with the fourth optical output signals OOS-AB may be detected (c.f. S260 in FIG. 2b). On the basis of the at least one second radiometric and/or photometric quantity, electronic measurement signals SA may be output by the first detection element 130A to the first electronic processing unit 116A and a second cryptographic key signal may be determined on the basis of the at least one second radiometric and/or photometric quantity (c.f. S265 in FIG. 2b).

Accordingly, cryptography key signals keyA and keyB may be generated in the cryptography key distribution system 100 at the output of the first and second optical encryption terminals 110A and 110B.

Figure 2A:
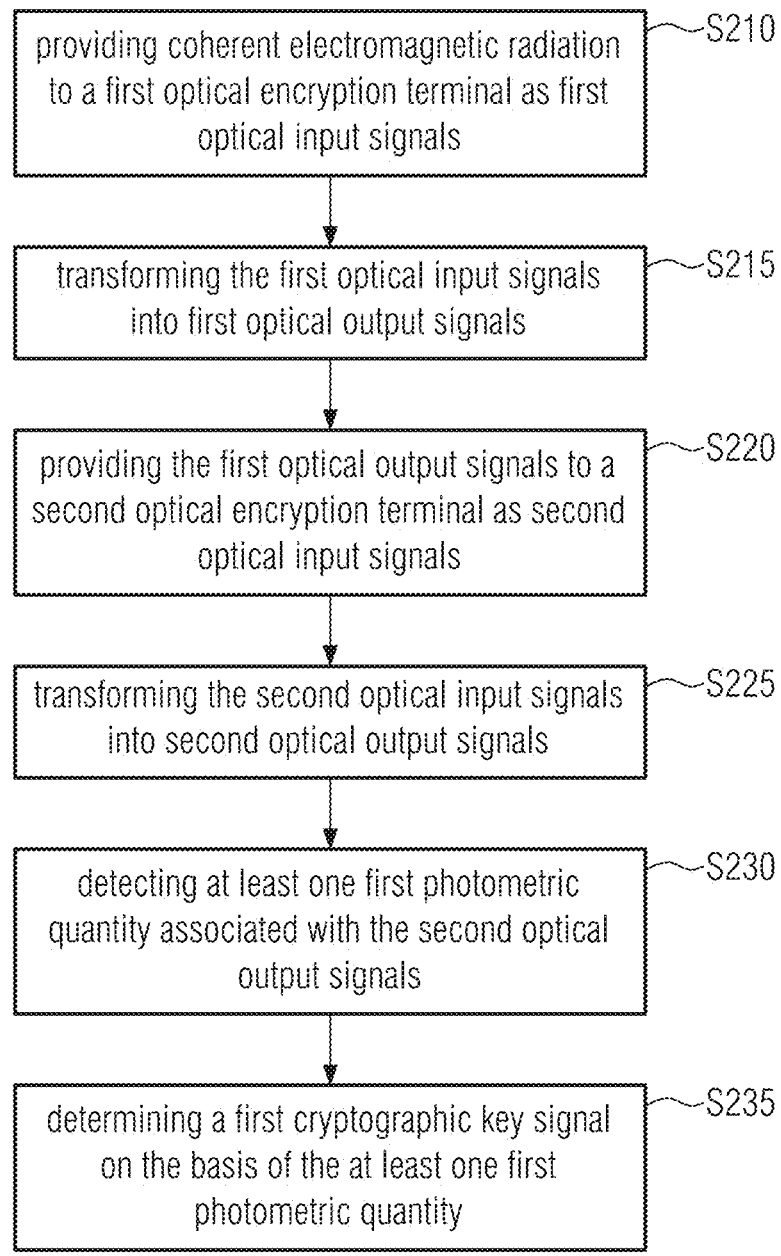
FIGS. 2a and 2b show process flows of a method of generating and distributing cryptographic keys in a cryptography key distribution system in accordance with some illustrative embodiments of the present invention.
Figure 2B:
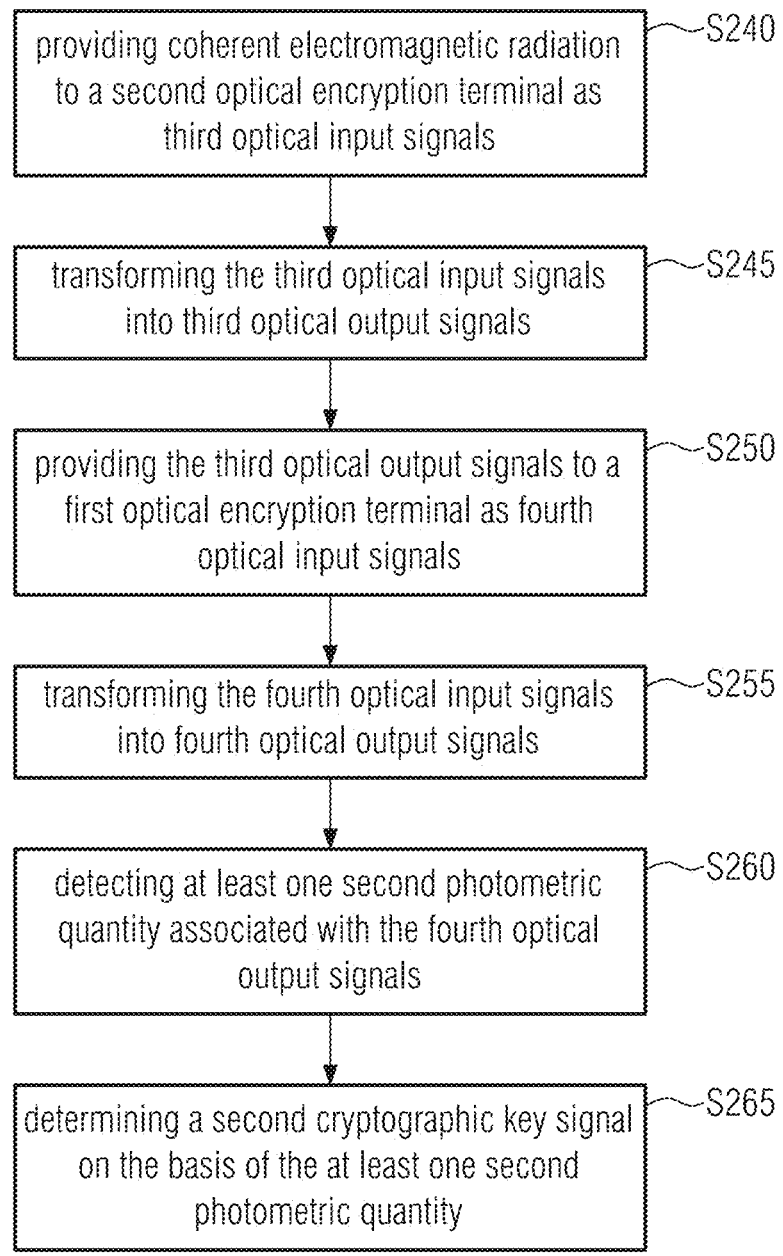

The person skilled in the art will appreciate that the process flows depicted in FIGS. 2a and 2b may be combined such that the key signals keyA and keyB may be determined simultaneously or successively. For example, the key signal keyA may be determined prior to determining the key signal keyB or vice versa.

In accordance with some illustrative embodiments of the present disclosure, the first and third optical input signals OIS-A and OIS-B may be similar, e.g., identical. For example, the first and second source 120A and 120B may emit electromagnetic radiation that is substantially equal, e.g., with regard to an emitted power density spectrum of electromagnetic radiation. Herein, the second and fourth optical output signals OOS-AB and OOS-BA may be identical and the determined cryptography key signals keyA and keyB may be the same. Accordingly, a cryptographic key may be exchanged between the users of the optical encryption terminals 110A and 110B.

With regard to FIG. 3, an optical encryption terminal 312 in accordance with some illustrative embodiments of the present disclosure will be described below in greater detail.

Figure 3:
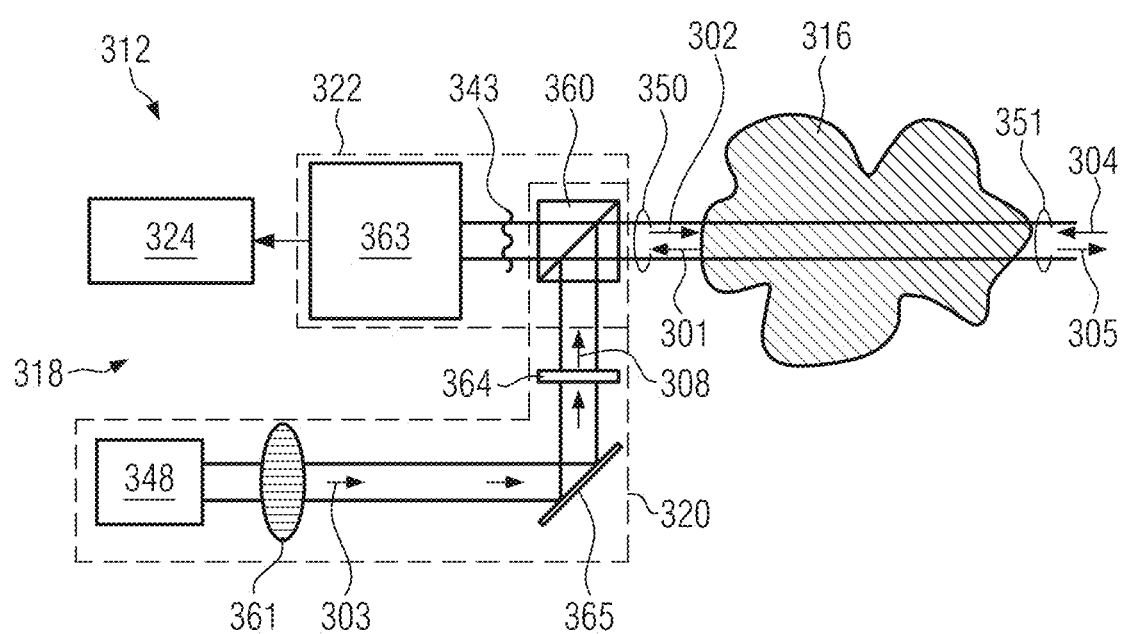
FIG. 3 schematically illustrates an optical encryption terminal in accordance with some illustrative embodiments of the present disclosure.

FIG. 3 schematically illustrates, in a schematic block diagrammatic view, the optical encryption terminal 312 for generating and distributing a cryptographic key signal in a cryptography key distribution system (e.g., the cryptography key distribution system 100 as described above with regard to FIG. 1), the cryptography key distribution system having the optical encryption terminal 312 and at least one further optical encryption terminal (not illustrated), wherein the optical encryption terminal 312 comprises an electronic processing unit 324.

In accordance with some illustrative examples, the optical encryption terminal 312 may be configured to selectively receive first optical input signals (indicated by arrows 303 and 308 in FIG. 3, representing optical input signals being generated by a source 348 of electromagnetic radiation) and second optical input signals (indicated by arrow 304 in FIG. 3, representing optical input signals being generated by a further optical encryption terminal (not illustrated)) being optically input into the optical encryption terminal 312 via a first optical input/output port 351).

In accordance with some illustrative embodiments of the present disclosure, the optical encryption terminal 312 may be configured to selectively output optical output signals (indicated by 301 in FIG. 3) to a detection element 363 via a second optical input/output port 350, and to the further optical encryption terminal (not illustrated) via the first optical input/output port 351 as indicated by arrow 305 in FIG. 3. The optical output signals 301 and 305 are based on respective input signals 304 and 302 that are transformed in accordance with an optical encryption pattern 316 provided at the optical encryption terminal 312 similarly to the optical encryption patterns 114A, 114B described above with regard to FIG. 1. The optical output signals 301 output to the detection element 363 are based on the optical input signals 301 generated by the further optical encryption terminal (not illustrated).

Using the electronic processing unit 324, a cryptographic key signal may be determined on the basis of at least one radiometric and/or photometric quantity (similar to the first and second radiometric and/or photometric quantities described above) detected by the detection element 363 and being coupled into the optical encryption terminal 312 via the first optical input/output port 351 and being transformed by the optical encryption pattern 316.

In accordance with some illustrative embodiments of the present disclosure, the optical input signals 303 and 308 may be provided to the second optical input/output port 350 and may be directed to the optical encryption pattern 316 for transforming the optical input signals 303, 308 into optical output signal 305 being output from the first optical input/output port 351 to the further optical encryption terminal (not illustrated).

In accordance with some illustrative embodiments of the present disclosure, a beam splitter 360 may be provided in between the detection element 363 and the second optical input/output port 350 of the optical encryption terminal 312. Alternatively, the beam splitter 360 may be provided as an integral part of the optical encryption terminal in between the second optical input/output port 350 and the optical encryption pattern 316.

In accordance with some illustrative embodiments of the present disclosure, the electromagnetic radiation generated by the source 348 of electromagnetic radiation may be collimated into a collimated beam by means of a collimating optics 361 and directed to the beam splitter 360 by means of a reflecting surface 365. This does not pose any limitation to the present disclosure and the person skilled in the art will appreciate that at least one of the collimating optics 361 and the reflecting element 365 may be optional.

In accordance with some illustrative embodiments of the present disclosure, the beam splitter 360 may be a polarizing beam splitter. In accordance with some special illustrative examples herein, a polarization element 364 may be disposed between the source 348 and the beam splitter 360. Upon selecting an orientation of the polarizing element 364 perpendicular with regard to an orientation of the polarizing beam splitter 360, i.e., electromagnetic radiation passing the polarizing element 364 may be polarized such that the polarized electromagnetic radiation may not pass through the polarizing beam splitter towards the detection element 363. Accordingly, interference between the optical output signals 301 being transformed by the optical encryption pattern 316 at the detection optical element 363 with optical input signals generated by the source 348 is avoided.

A person skilled in the art might appreciate that the encryption terminal schematics depicted in FIG. 3 can be realized with fiber optics technology, where a single mode or multimode fiber is placed after the collimating lens to guide the light energy along the path 361, 301, and the beam splitter 360 is a fiber circulator. The polarization element 364 might be realized by a fiber-based polarization controller.

Figure 4:
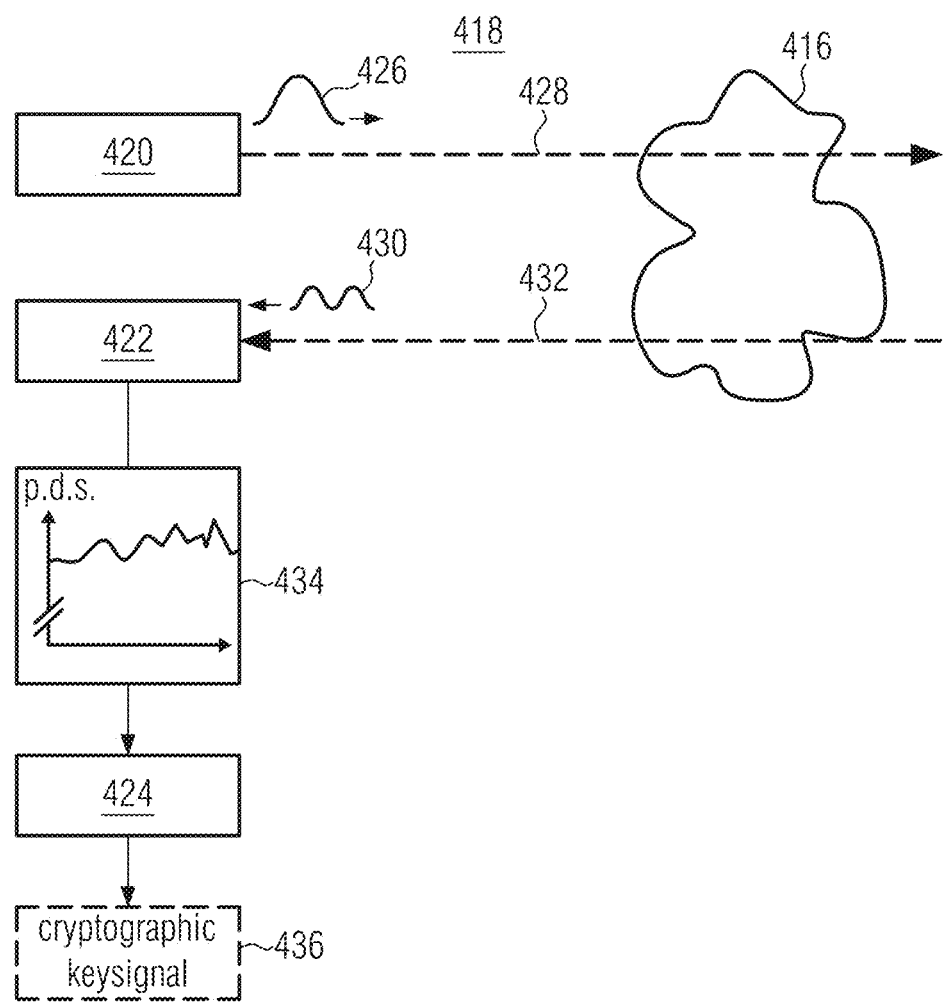
FIG. 4 schematically illustrates an optical encryption terminal in accordance with some further illustrative embodiments of the present disclosure.

With regard to FIG. 4, generation and distribution of a cryptographic key signal in an optical encryption terminal 418 (may be similar to at least one of the optical encryption terminals as described above with regard to FIGS. 1 to 3) of a cryptography key distribution system (e.g., the cryptography key distribution system 100 as described above with regard to FIG. 1) is schematically illustrated in a block diagrammatic view.

As schematically depicted in FIG. 4, the optical encryption terminal 418 may comprise an optical encryption pattern 416, a source 420, a detection element 422, and an electronic processing unit 424. In accordance with some illustrative examples herein, the source 420, the detection element 422, the optical encryption pattern 416, and the electronic processing unit 424 may be integrated into the optical encryption terminal 418. Alternatively, at least one of the source 420 and the detection element 422 may be optional and the optical encryption terminal 418 may be configured to couple to the optional and omitted element.

In accordance with some illustrative embodiments of the present disclosure, the source 420 of the optical encryption terminal 418 may generate a signal of electromagnetic radiation 426, including and not limited to, e.g., a Gaussian wave packet and/or a wave packet having a spectrum with a profile of a Lorentz or Cauchy distribution and/or a Voigt profile, having a characteristic width around a center wavelength. The emitted electromagnetic radiation 426 may be emitted along a light path 428 towards the optical encryption pattern 416 before leaving the optical encryption terminal 418 towards a further optical encryption terminal (not illustrated).

In accordance with some illustrative embodiments of the present disclosure, the optical encryption terminal 418 may receive optical input signals from the other optical encryption terminal (not illustrated) that is exposed to the optical encryption pattern 416 along a light path 432 and being directed towards the detection element 422 as optical signals being subjected to the combined effect of the optical encryption pattern 416 of the optical encryption terminal 418 and another optical encryption pattern (not illustrated) of the other optical encryption terminal (not illustrated).

In accordance with some illustrative embodiments of the present disclosure, the detection element 422 of the optical encryption terminal 418 may be configured to determine a power distribution spectrum (p.d.s.) of the received optical signal 430, as schematically indicated by means of the spectrum 434 in FIG. 4. Herein, the power density spectrum (p.d.s. or PDS), or spectral density, $S_{xx}(f)$ of an optical signal $x(t)$ describes the distribution of power into frequency components composing that signal. The p.d.s. is represented as a plot with the frequency on the horizontal axis and the distribution of optical power on the vertical axis.

In accordance with some illustrative but non-limiting embodiments of the present disclosure, the detection element 422 may comprise an optical spectrum analyzer or an optical spectrometer.

In accordance with some illustrative embodiments of the present disclosure, the electronic processing unit 424 may be configured to determine a cryptographic key signal 436 on the basis of the output spectrum 434 detected by the detection element 422. Accordingly, a cryptographic key signal may only be generated after optical signals 430 being subjected to the combined action of the optical encryption pattern 416 and the other optical encryption pattern (not illustrated) of the further optical encryption terminal (not illustrated) is detected.

With regard to FIG. 5, a cryptography key distribution system 510 in accordance with some illustrative embodiments of the present disclosure will be described.

Figure 5:
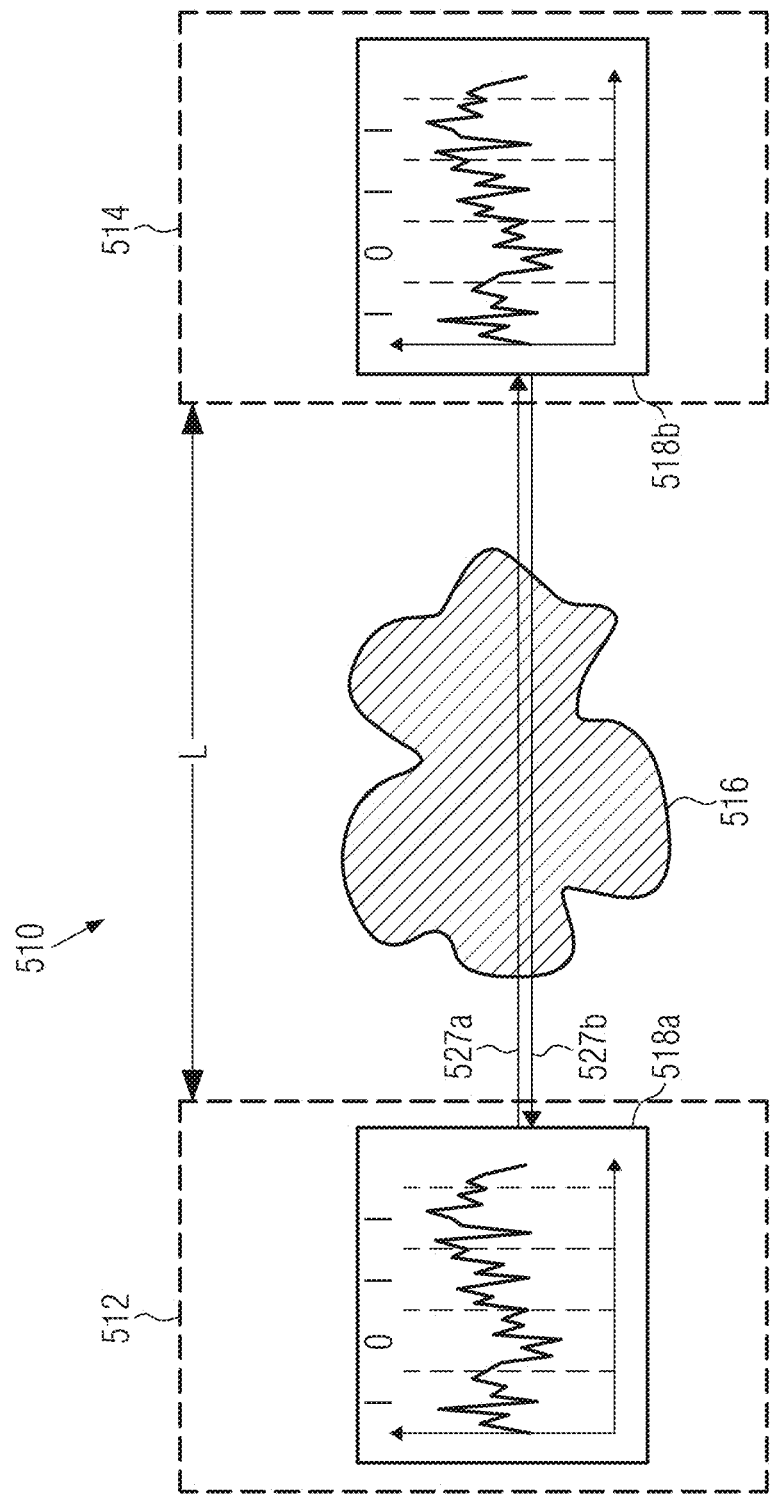
FIG. 5 schematically illustrates a cryptography key distribution system in accordance with some illustrative embodiments of the present disclosure.

In accordance with some illustrative embodiments herein, the cryptography key distribution system 510 as depicted in FIG. 5 may represent a system for generating and distributing a cryptographic key between two users 512 and 514, particularly, for rendering two identical copies available at the two optical encryption terminals of the users 512 and 514, similarly to the cryptography key distribution system 100 as described above with regard to FIG. 1. The two users 512 and 514 may be separated from each other by an arbitrary distance L, which may be as large as up to 100 kilometers for intra-city networks and larger for inter-city networks. Long distances can be reached with the use of standard telecommunication optical amplifiers. In accordance with some illustrative embodiments of the present disclosure, electromagnetic radiation signals 527a (electromagnetic radiation signals from user 512 to user 514) and 527b (from user 514 to user 512) may be exchanged between the two users 512 and 514, the two signals 527a, 527b being subjected to transformations associated with optical encryption patterns as schematically illustrated by the region 516 representing the combined action of two optical encryption patterns. Each of the users 512 and 514 may have an optical encryption terminal for deriving a cryptographic key from power distribution spectra 518a, 518b as measured at each end, i.e., the user 512 measures a p.d.s. from the electromagnetic radiation 527b, while the user 514 measures the p.d.s. 518b of the electromagnetic radiation 527a. Each of the users 512, 514 may employ an optical encryption terminal as described above to FIGS. 1 to 4.

In accordance with some illustrative embodiments of the present disclosure, a cryptographic key may be determined on the basis of the measured p.d.s. 518a and 518b, respectively. In accordance with an illustrative but not limiting example, each numeric value of the spectrum 518a and 518b may be rendered for extracting an amplitude between zero and one (i.e., the mantissa) and the absolute value of an exponent of the numeric value. Upon, for example, rounding the mantissa to the nearest integer and converting the absolute value of the determined exponent to a binary value, five binary digits may be obtained. For example, in case that a numeric value in the spectrum is measured as the number $2.2*10^{13}$ (in arbitrary units), the mantissa is 0.22, while the absolute value of the exponent is 12. When rounding the mantissa to the nearest integer, "0" is obtained, while converting the absolute value of the exponent into four binary digits, the sequence binary 1100 is obtained. Accordingly, the five bit binary sequence 01100 represents the measured number $2.2*10^{13}$ in arbitrary units, where the last four digits represent a binary representation of the integer number 12, and the first number is the rounded nearest integer to 0.22. Therefore, when assuming, for example, a measurement resolution of 1000 points per 100 nm optical bandwidth (i.e., a resolution of 0.1 nm), a key with a length of 5 kB for each spectrum may be obtained.

Alternatively, a measured spectrum may be partitioned into regions as indicated by broken lines in the spectra 518a and 518b, and from a mean value within each region, a binary digit "1" and "0" may be determined by, for example, comparing the mean value with specific threshold values or rounding a fraction of the mean value relative to a total mean value of all regions to the nearest integer and converting it into a binary digit. Accordingly, a sequence of binary digits, such as "1011" as indicated in FIG. 5, may be obtained by each user 512, 514.

With regard to FIGS. 6a to 6e, an optical encryption terminal in accordance with some illustrative embodiments of the present disclosure will be described and measurements performed by the inventors with regard to the described optical encryption terminal will be presented and discussed.

Figure 6A:
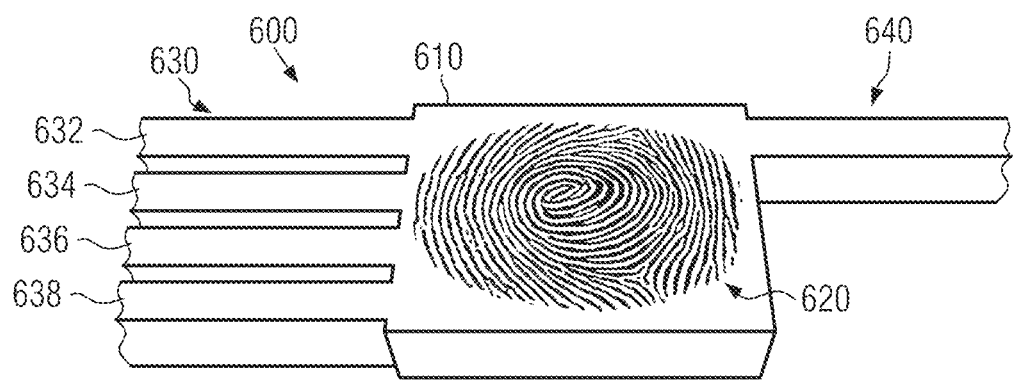
FIGS. 6a, 6b, 6c, 6d, and 6e schematically illustrate an optical encryption terminal in accordance with some special illustrative embodiments of the present disclosure, together with measurements performed at the optical encryption terminal.

FIG. 6a schematically illustrates an optical encryption terminal 600 in accordance with some illustrative embodiments of the present disclosure. The optical encryption terminal 600 may comprise an optical pad 610 having an optical encryption pattern 620 formed therein, a plurality of input ports 630 (e.g., four input ports 632, 634, 636 and 638) and an output port 640 (the number of input and output ports is not limited and the person skilled in the art will appreciate that at least one input port and at least one output port may be provided).

In accordance with some illustrative embodiments of the present disclosure, the optical pad 610 may be implemented as a so-called "fingerprint chip", wherein the optical encryption pattern 620 may be realized as an image of a users fingerprint encoded into a crystal structure. In accordance with some illustrative examples herein, the optical pad 610 may be a photonic nanostructure having implemented therein the optical encryption pattern 620, e.g., as a series of circular holes patterned in the optical pad 610 with a shape in accordance with a users fingerprint. For example, a digital image of a users fingerprint may be transferred into a photonic structure via techniques known in the art of photonic nanostructure fabrication, including, and not limited to, electron-beam lithography, nano-imprinting and photo-lithography. The fingerprint chip of the optical encryption terminal 600, as depicted in FIG. 6a, may allow providing a user with an individually customized encryption terminal that is impossible to clone to a sufficient degree of exactness. However, the implementation of the optical encryption pattern 620 as an image of a fingerprint does not pose any limitation on the present disclosure and the person skilled in the art will appreciate that any other pattern may be used for implementing the optical encryption pattern, such as any pattern that is uniquely associated to the user, or any arbitrary pattern, not uniquely linked to a user, such as a random pattern. The user individual pattern can be generated from a users body characteristic, e.g., a footprint of a user's foot, a print of a user's toe, a print of a user's retina or any other image that a user desires to base the optical encryption pattern 620 on.

Upon employing the optical encryption terminal 600 in a cryptography key distribution system, e.g., any of the cryptography key distribution systems as described above with regard to FIGS. 1 to 5, the optical encryption terminal 600 may be coupled to a source (not illustrated in FIG. 6a) of electromagnetic radiation and a detection element (not illustrated in FIG. 6a) via its input ports 630. At the output side, the optical encryption terminal 600 may be optically coupled with another optical encryption terminal (not illustrated) by optically coupling another optical encryption terminal (not illustrated) to the output port 640 in FIG. 6a.

Figure 6B:
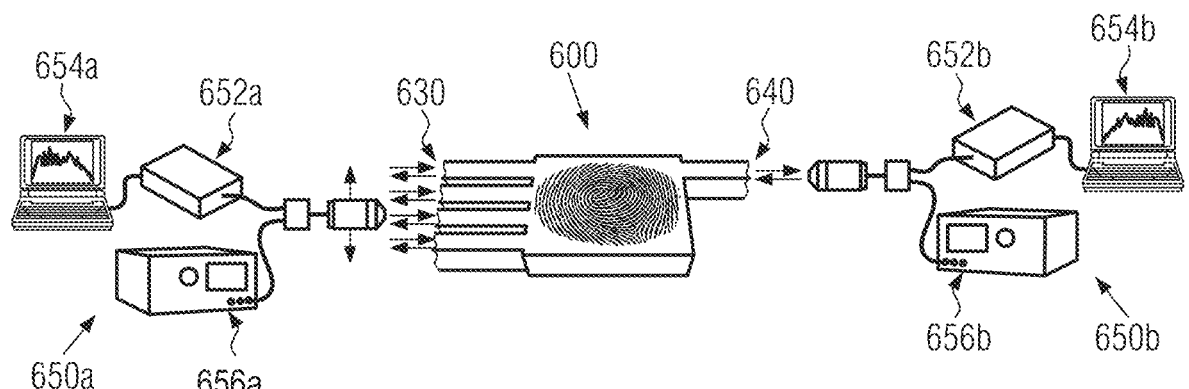

With regard to FIG. 6b, a test setup for performing measurements on the optical encryption terminal 600, as used by the inventors in an actual test setup, will be described.

In tests performed by the inventors, the optical encryption terminal 600 was coupled to a source 656a of electromagnetic radiation and a detection element 652a at the input side 650a, wherein the detection element 652a is coupled to an electronic processing unit 654a for outputting power distribution spectra. The source 656a and detection element 652a were selectively coupled to an input port of the plurality of input ports 630. At the output side 650b, a source 656b, a detection element 652b and an electronic processing unit 654b were optically and electronically coupled with the output port 640 of the optical encryption terminal 600.

Figure 6C:
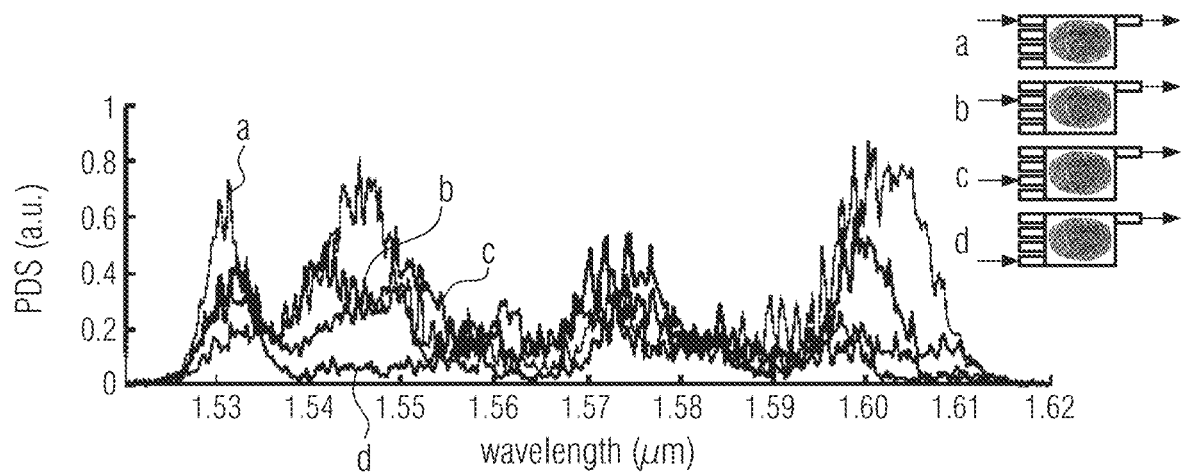

With regard to FIG. 6c, obtained power distribution spectra in accordance with four modes indicated by a, b, c and d in FIG. 6c are measured on the output side 650b, particularly as obtained by the electronic processing unit 654b.

Figure 6D:
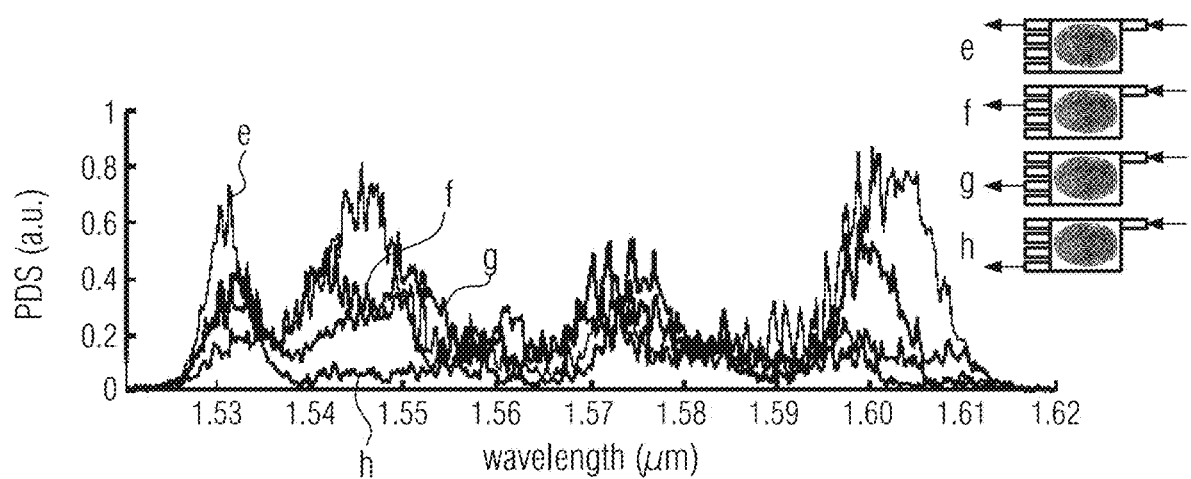

With regard to FIG. 6d, power distribution spectra are plotted in accordance with test configurations as indicated by e, f, g and h in FIG. 6d. Particularly, the test configurations a and e represent a mutual exchange between the input side 650a and the output side 650b using the same input/output channels. Similarly, the configurations b and f, c and g and d and h are test configurations in which optical signals are exchanged via corresponding input/output channels. A comparison between FIGS. 6c and 6d reveals that the power distribution spectra corresponding to the test configurations a and e match, whereas the spectra for the configuration b and f match, whereas the configurations for c and g match and in the case of d and h match.

Figure 6E:
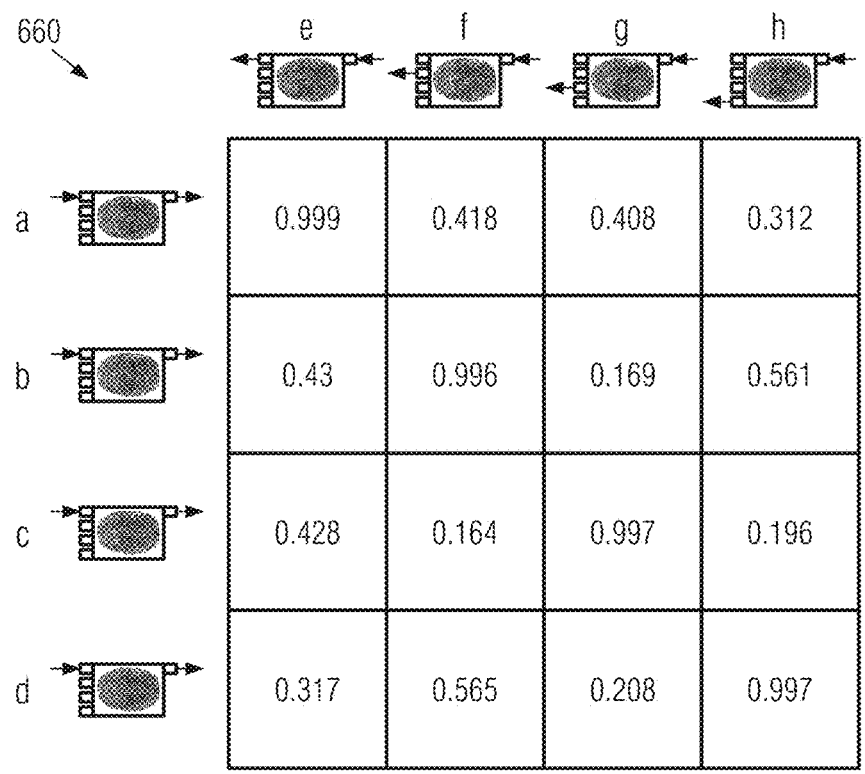

With regard to FIG. 6e, a 2×2 signal exchange arrangement between the configurations a, b, c and d relative to the configurations e, f, g and h is charted, wherein the signals strength from one configuration with regard to the other configurations is depicted. Particularly, the configurations along the diagonal of the two dimensional arrangement is nearly identical within the range of a few percent of the signal strength. Particularly, upon the input side and the output side of the testing arrangement in FIG. 6b employing matching input/output configurations, i.e., a and e, b and f, c and g, and d and h, almost identical power distributions spectra at each side of the optical encryption terminal 600 may be measured.

With regard to FIG. 7, another illustrative embodiment of the present disclosure will be described with regard to the implementation of an optical encryption pattern as a non-permanent optical encryption pattern.

Figure 7:
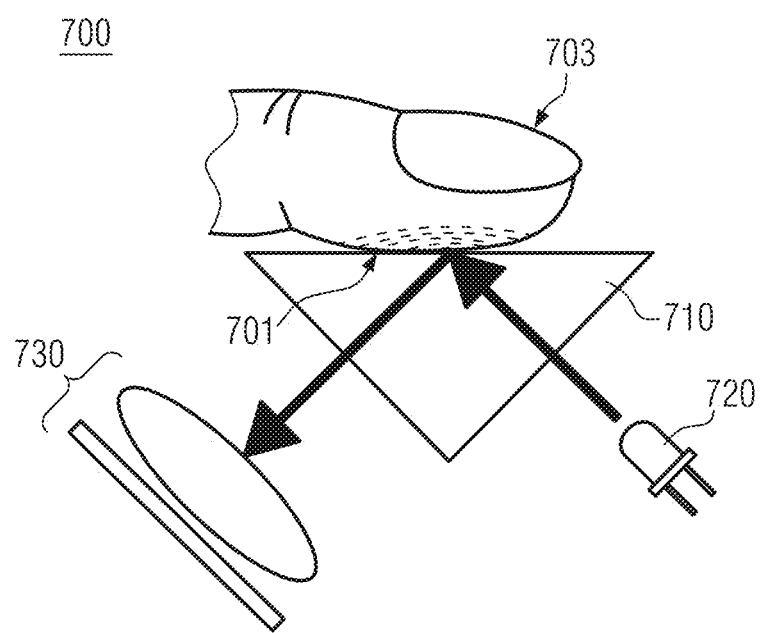
FIG. 7 schematically illustrates an optical encryption terminal in accordance with other illustrative embodiments of the present disclosure.

Referring to FIG. 7, an optical encryption terminal 700 is schematically illustrated during operation, the optical encryption terminal 700 having an optical encryption pattern 701 being formed by a user's finger 703 resting on an optical transparent medium, such as a prism 710. A source of electromagnetic radiation 720, e.g., a light emitting diode, laser diode and the like, may emit electromagnetic radiation towards the medium 710, wherein the electromagnetic radiation is reflected and scattered in dependence on the optical encryption pattern 701 which is temporarily formed on the medium 710, particularly as long as the finger 703 rests on the medium 710. The reflected light encoding a scattering and diffraction pattern of the optical encryption pattern 701 is directed to an output optic 730 for optically coupling the optical encryption terminal 700 with another optical encryption terminal (not illustrated) in the manner as described above with regard to the cryptography key distribution system, e.g., the cryptography key distribution system 100 as described with regard to FIG. 1. In this way, each time a user rests his finger on the medium 710, a unique optical encryption pattern 701 may be formed, particularly in a non-repetitive and unclonable manner. In this way, a secure generation and distribution of cryptographic keys may be provided.

In accordance with some illustrative embodiments of the present disclosure, optical encryption terminals may be implemented as integrated fingerprint chips. The person skilled in the art will appreciate that integrated fingerprint chips represent an illustrative implementation of a physical one-time pad that allows creating and distributing cryptographic keys in a cryptography key distribution system employing two integrated fingerprint chips of two communicating users. The person skilled in the art will appreciate that integrated fingerprint chips exploit a complex random scattering of light and create unique physical keys that are impossible to duplicate or clone. The security of exchanged keys in a cryptography key distribution system employing such integrated fingerprint chips is not based on statistical arguments, but relies on the impossibility for a third person to get access to the cryptography key distribution system created by the two different fingerprint chips of the two communicating users. In experiments, the inventors measured that, even using two fingerprint chips that were fabricated under the same experimental conditions, two fingerprint chips having slightly different characteristics are generated which allow generating cryptography keys that are totally different and uncorrelated with each other. Despite of using two fingerprint chips with the same experimental conditions, imperfections are introduced into the fingerprint chips resulting in unique features of each fingerprint chips which guarantees the uniqueness of the key generated by a system of two specific fingerprint chips.

With regard to FIG. 8, a situation is schematically illustrated where the inventors made use of two fingerprint chips communicating via channels $A_2$, $B2$ for generating and distributing a key which is used by the user "Alice" to encrypt a picture "A". Only upon the second user "Bob" using a key measured by matching channels A to $B_1$, a key for successfully decrypting the cipher text is obtained (c.f. FIG. 8c). With regard to FIG. 8d, unsuccessful attempts of an eavesdropper "Eve" to intercept a communication between "Alice" and "Bob" is illustrated. Therefore, a secure communication between "Alice" and "Bob" is implemented.

In the following, a man in the middle attack performed by the eavesdropper, such as "Eve" in FIG. 8, will be described with reference to FIGS. 9 and 10.

Figure 9:
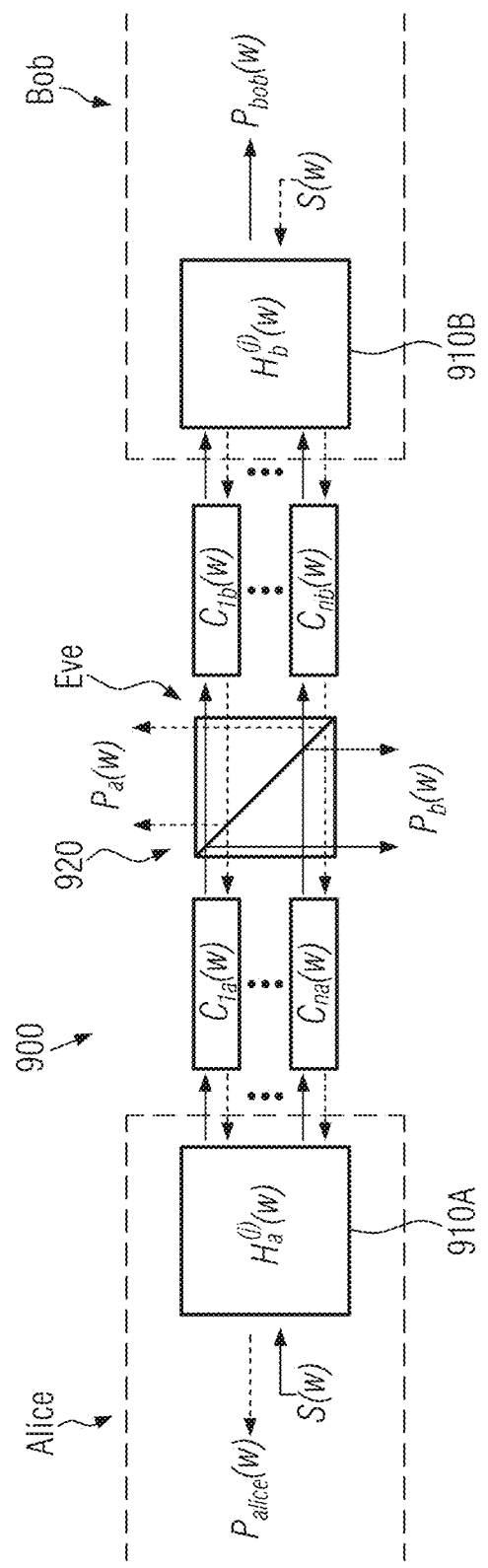
FIG. 9 shows a block representation of a communication system in accordance with some illustrative embodiments of the present disclosure.

FIG. 9 shows a block representation of a communication system 900 between "Alice" and "Bob" (such as "Alice" and "Bob" in FIG. 8), in an illustrative case where an optical chip 910A of Alice and an optical chip 910B of Bob are connected to a multichannel communication network 920, e.g., a standard multichannel communication network. In accordance with some illustrative and non-limiting examples herein, each channel (e.g., modes of a fiber) of the multichannel communication network 920 may be able to carry information supplied to the communication network 920 by at least one independent source, e.g., at least Alice and Bob.s. For the present discussion of the man in the middle attack, each of the block of the communication system 900 is represented by a transfer function which may be understood as indicating the response to an incoming signal. Particularly, each of the optical chips 910A and 910B is represented by a respective transfer function $H_{a/b}(\omega)$, while each channel of the multichannel communication network 920 is represented by a transfer function $C_{na/b}(\omega)$, which may be also understood as representing the frequency dependent input-output relationship for signals entering and going out from the respective optical chip 910A, 910B. Furthermore, a source is represented in FIG. 9 by a power density spectrum $|S(\omega)|^2$ and $P_{alice}$, $P_{bob}$ and $P_{a/b}$, respectively, indicate in FIG. 9 a power density spectra measured by Alice, Bob and Eve, respectively.

During each communication between Alice and Bob, the source signal $|S(\omega)|^2$ is first modified by the optical chips of Alice and Bob. The emerging signal is then coupled to different channels and transmitted to the other side, where is then retrieved. The power density spectrum measured by Alice and Bob is:

$$P_{alice/bob}(\omega) = |S(\omega)|^2 \cdot |H_a^{(j)}(\omega)|^2 \cdot |H_b^{(j)}(\omega)|^2 \cdot |C(\omega)|^2, \quad (1)$$

where $|C(\omega)|^2$ is the contribution of the full transmission system, which can be represented as follows:

$$P_x(\omega) = |S(\omega)|^2 \cdot |H_x^{(j)}(\omega)|^2 \cdot \sum_n |C_{nx}(\omega)|^2, \quad (3)$$

with $C_{na}(\omega)$ and $C_{nb}(\omega)$ the transfer function of each channel that connects Eve with Alice and Bob. The power density spectrum measured at Eve side, conversely, reads as follows:

$$|C(\omega)|^2 = \sum_n |C_{na}(\omega)|^2 \cdot |C_{nb}(\omega)|^2, \quad (2)$$

with x=a, b indicating the signal measured by Eve when the communication is initiated by (a) Alice or (b) Bob, respectively. By comparing Eqs. (3) with (1)-(2) we immediately observe that Eve cannot reproduce the power density spectra measured by Alice/Bob, due to the incomplete spectral information on the transmission channel $$\sum_n |C_{nx}(\omega)|^2,$$

which Eve measures without the possibility of determining the full transmission line $C(\omega)$. In fact, in the case where Eve does the product of the acquired spectra $P_e(\omega)=P_a(\omega)\cdot P_b(\omega)$, the information on the transmission system retrieved by Eve is:

$$P_e \propto \sum_n |C_{na}(\omega)|^2 \cdot \sum_m |C_{mb}(\omega)|^2 \neq \sum_n |C_{na}(\omega)|^2 \cdot |C_{nb}(\omega)|^2 = |C(\omega)|^2, \quad (4)$$

which does not represent the contribution of the transmission line $|C(\omega)|^2$ measured by Alice and Bob. In order to reconstruct the function $C(\omega)$ Eve needs to independently measure and store the signal traveling on all the possible channels, extract the transfer function $C_{nx}(\omega)$ of each channel and indirectly reconstruct the channel transfer function $C(\omega)$ from (2). Even with the latest advances in communication data analysis, however, this type of measure is impossible: in a standard optical communication network, there are millions of single-mode fibers, and the user does not know a-priori in which channel the traffic is routed. In the proximity of the user, where there is typically a single line, the information is usually multiplexed in multimode fibers with thousands of modes; and storing in real time the content of information on each channel is not possible. In wireless networks or free-space links, there is an infinite number of channels and paths where electromagnetic waves can travel; and monitoring all of them is impossible.

It should be noted that even in situations when this type of measure could be hypothetically possible, the reconstruction of the information exchanged between Alice and Bob would still be impossible. In a situation when there is a single fiber connecting Alice and Bob and the fiber is single-mode, the product of the power density spectra $P_e(\omega)=P_a(\omega)\cdot P(\omega)$ measured by Eve is as follows:

$$P_e = |S(\omega)|^4 \cdot |H_a^{(f)}(\omega)|^2 \cdot |H_b^{(f)}(\omega)|^2 \cdot |C_{1a}(\omega)|^2 \cdot |C_{1b}(\omega)|^2, \quad (5)$$

By comparing Eqs. (5) with Eqs. (1)-(2) in the case of n=1 channel, we immediately observe that the measurements of Eve do not reproduce the signal exchanged between Alice and Bob, due to the power density spectrum of the source $|S(\omega)|^4 \equiv P_s^2$ (with $P_s=|S(\omega)|^2$ defining the power density spectrum of Alice source), which is present 2 times in all measurements of Eve owing to the bidirectional nature of our communication scheme. The source belongs to Alice and Bob only and is not accessible to Eve. However even in the case where Eve has physical access to the source, she still cannot measure $P_s$. The quantity $P_s$ in the block diagram of Supplementary FIG. 9 is in fact an ideal quantity, which represents the isolated density spectrum of the source when is not connected to any instrument. It is well known that measuring this quantity is impossible: as soon as Eve connects the source to an instrument, in fact, she breaks the isolated nature of the source and introduces in the measure a spectrally varying coupling coefficient, which is not a-priori known and that affect all the results. This problem is the same of measuring the ideal temperature of a body. As soon as a thermometer is put in contact with the body, the temperature of this system changes, and the thermometer reads just an equilibrium temperature between the body and the thermometer and not the real temperature of the body. This type of uncertainty is embedded in the intrinsic nature of our measurements and cannot be avoided.

In order to illustrate this point quantitatively for the communication scheme described above with regard to illustrative embodiments of the present disclosure, the inventor performed experiments, the results of which are illustrated in FIG. 10.

Figure 10A:
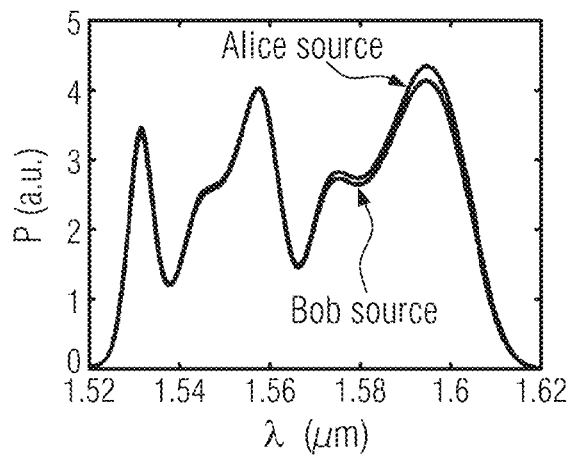
FIG. 10a shows a graph illustrating a power density spectra of sources system in accordance with some illustrative embodiments of the present disclosure.

FIG. 10a shows a graph illustrating a power density spectra of sources used by Alice and Bob, measured with the same physical apparatus used by Alice and Bob in the key distribution scheme of the present disclosure. The sources employed by Alice and Bob may substantially have the same power density spectrum. The inventors repeated the measurement over different times and the measurements were observed to be stable.

Figure 10C:
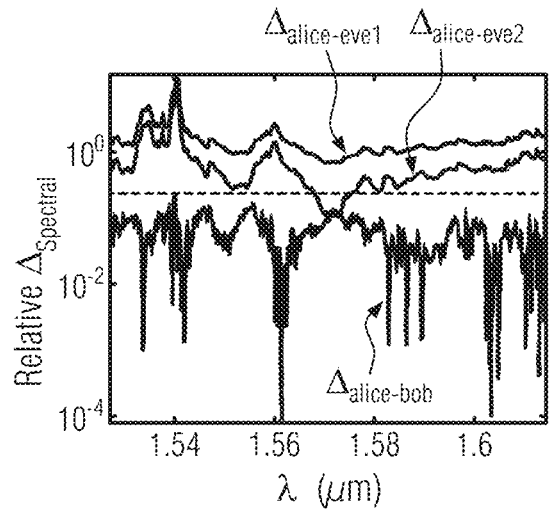
FIG. 10c shows a relative difference between measured spectra in accordance with some illustrative embodiments of the present disclosure.
Figure 10B:
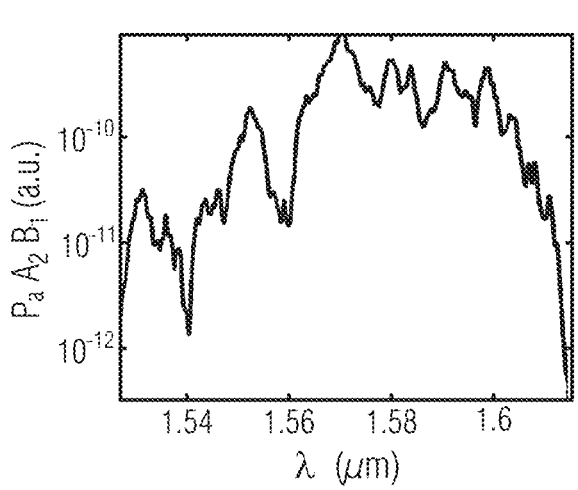
FIG. 10b shows a power density spectrum in accordance with some illustrative embodiments of the present disclosure.

FIG. 10b shows in log-scale a representative power density spectrum measured at Alice side, and corresponding to the input condition $A_2B_1$. Contrary to the source, the power density spectrum varies over different decades, showing a quite complex oscillatory pattern.

FIG. 10c reports in log-scale the relative difference between the spectra measured by Alice and Bob (indicated in FIG. 10c as $\Delta_{alice-bob}$) and between Alice and Eve (indicated in FIG. 10c as $\Delta_{alice-eve1}$) in the case where Eve tries to reconstruct the spectrum of Alice via normalization $P_{eve}=P_e/P_s$. The spectra are totally different, of more than one order of magnitude. This originates from the fact that what Eve measures is just a representation of the spectrum, with a coupling coefficient between the source and the instrument that is unknown.

However, even in the case where the spectra of Alice and Eve are normalized on their maximum (indicated in FIG. 10c as $\Delta_{alice-eve2}$), their shape is still different in most of their part. This originates from the fact that uncertainties in $P_s$, even if small, are exponentially amplified when the spectra are normalized via $1/P_s$, especially in the points where the amplitudes are small. It is well known that these types of normalizations cannot be practically employed for large bandwidth signals, as the resulting reconstructions are very noisy, especially for strongly oscillating spectra such as the one exchanged between Alice and Bob such as the optical chips 910A and 910B in FIG. 9.

Figure 10D:
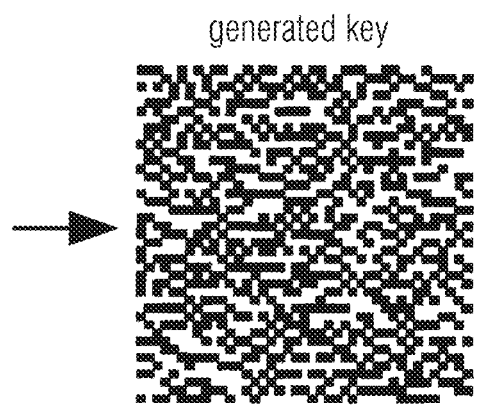
FIG. 10d shows a generated key in accordance with some illustrative embodiments of the present disclosure.

Supplementary FIG. 10d analyzes the effects of the spectral differences between Alice, Bob and Eve on the generated key. The key resulting from the spectrum of FIG. 10b is displayed as a square matrix of zero (black points) and ones (white points) in the top panel of FIG. 10d. As it is visually observed, the generated bits are uncorrelated. The inventors computed statistics with 250 generated keys and obtained a hamming distance (i.e., the percent of different bits) between the keys generated by Alice and Bob of only 5%, while in the case of Eve (also in the case where the spectra are rescaled to the same value), becomes around 50%, which implies the maximum entropy condition where half of the bits are randomly inverted.

The person skilled in the art will appreciate after a lecture of the present disclosure that any cryptography key distribution system of the present disclosure may be implemented in a communication system for providing communication between third party devices and a controller employing a cryptography key distribution system of the present disclosure. In accordance with some illustrative and non-limiting examples, at least one of the first and second sources of electromagnetic radiation may be provided as an optoelectronic converter or modulator integrated in the third-party device. In some special illustrative examples, the communication system may be embedded or implemented in a network of physical devices, vehicles, home appliances and other items embedded with electronics, software, sensors, actuators, and connectivity which enables these objects to connect and exchange data (so-called 'Internet of things' or IoT), wherein each thing is uniquely identifiable through its embedded computing system but is able to inter-operate within the existing Internet infrastructure.

In accordance with some illustrative embodiments of the present disclosure, the above described cryptography key distribution (CKD) system may be applied to a communication system, e.g., an optical communication system. In an illustrative but not limiting example herein, the above described cryptography key distribution system may be integrated in a fiber-optic communication system.

In accordance with some illustrative embodiments herein, keying-based digital modulators, such as frequency-shift keying (FSK), amplitude-shift keying (ASK), quadrature amplitude modulation (QAM) and/or any type of phase shift keying (PSK), may be integrated in the input side and/or output side of at least one of the encryption terminals of the described cryptography distribution system. For example, a digital-to-analog-converter (DAC) means may be arranged so as to transform a transmission sequence which is transmitted to one of the encryption terminals, into an analog waveform, resulting in an electrical signal which may then be optically modulated using by a modulator and transmitted through the internal CKD's analog optical fiber. The CKD may transform the signal into an unbreakable optical image, which may then be opt-electrically converted and further digitally converted using a standard analog-to digital-converter (ADC) means or a differential Pulse Code Modulator system and which may then be re-integrated back into the communication system.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a short-hand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. An optical encryption terminal for generating and distributing a cryptographic key signal in a cryptography key distribution system with at least two optical encryption terminals, the optical encryption terminal comprising an electronic processing unit, wherein the optical encryption terminal is configured to:
in a first mode,
receive first optical input signals generated by a source of electromagnetic radiation;
output first optical output signals to a further optical encryption terminal;
in a second mode,
receive second optical input signals generated by the further optical encryption terminal;
output second optical output signals to a detection element, the second optical output signals being based on the second optical input signals being transformed in accordance with an optical encryption pattern provided at the optical encryption terminal; and
determine, using the electronic processing unit, a cryptographic key signal on the basis of at least one radiometric and/or photometric quantity associated with the second optical output signals detected by the detection element.

2. The optical encryption terminal of claim 1, wherein the optical encryption pattern comprises a plurality of regions of a first material randomly arranged in a second material, wherein the first and second materials differ in at least one optical characteristic from each other.

3. The optical encryption terminal of claim 2, wherein the first material has a greater absorptive and/or transmissive and/or diffractive characteristic with regard to the electromagnetic radiation than the second material.

4. The optical encryption terminal of claim 2, wherein the plurality of regions of the first material is arranged in accordance with a random and/or chaotic and/or predefined scattering pattern.

5. The optical encryption terminal of claim 1, wherein the optical encryption pattern is formed in a photonic nanostructure.

6. A cryptography key distribution system, comprising:
a first optical encryption terminal configured to transform optical input signals into optical output signals in accordance with a first optical encryption pattern provided at the first optical encryption terminal;
a second optical encryption terminal configured to transform optical input signals into optical output signals in accordance with a second optical encryption pattern provided at the second optical encryption terminal, the first and second optical encryption terminals being optically coupled so as to mutually exchange optical output signals;
a first source of electromagnetic radiation configured to provide the first optical encryption terminal with first input signals of electromagnetic radiation;
a second source of electromagnetic radiation configured to provide the second optical encryption terminal with second input signals of electromagnetic radiation;
a first detection element configured to detect at least one first radiometric and/or photometric quantity associated with first optical output signals of the first optical encryption terminal, the first optical output signals being based on the second input signals being successively transformed by the second and first optical encryption terminals;
a second detection element configured to detect at least one second radiometric and/or photometric quantity associated with second optical output signals of the second optical encryption terminal, the second optical output signals being based on the first input signals being successively transformed by the first and second optical encryption terminals;
a first electronic processing unit coupled to the first detection element, the first electronic processing unit being configured to determine a first cryptographic key signal on the basis of at least one first radiometric and/or photometric quantity detected by the first detection element; and a second electronic processing unit coupled to said second detection element, the second electronic processing unit being configured to determine a second cryptographic key signal on the basis of at least one detected second radiometric and/or photometric quantity detected by the second detection element.

7. The cryptography key distribution system of claim 6, wherein the each of the first and second optical encryption patterns comprises a plurality of regions of a first material randomly arranged in a second material, wherein the first and second materials differ in at least one optical characteristic from each other.

8. The cryptography key distribution system of claim 7, wherein the first material has a greater absorptive and/or transmissive and/or diffractive characteristic with regard to the electromagnetic radiation than the second material.

9. The cryptography key distribution system of claim 6, wherein the plurality of regions of the first material is arranged in accordance with a random and/or chaotic and/or predefined scattering pattern of a respective optical encryption terminal.

10. The cryptography key distribution system of claim 6, wherein each of the first and second optical encryption patterns is formed in a photonic structure.

11. A method of generating cryptographic keys in a cryptography key distribution system having a first optical encryption terminal and a second optical encryption terminal, the method comprising:
  providing the first optical encryption terminal with electromagnetic radiation of a first source of electromagnetic radiation as first optical input signals;
  transforming the first optical input signals into first optical output signals in accordance with a first optical encryption pattern formed at the first optical encryption terminal;
  providing the second optical encryption terminal with the first optical output signals as second optical input signals;
  transforming the second optical input signals into second optical output signals in accordance with a second optical encryption pattern formed at the second optical encryption terminal;
  detecting at least one first radiometric and/or photometric quantity associated with the second optical output signals; and
  determining a first cryptographic key on the basis of the at least one detected first radiometric and/or photometric quantity.

12. The method of claim 11, further comprising:
  providing the second optical encryption terminal with electromagnetic radiation of a second source of electromagnetic radiation as third optical input signals;
  transforming the third optical input signals into third optical output signals in accordance with the second optical encryption pattern;
  providing the first optical encryption terminal with the third optical output signals as fourth optical input signals;
  transforming the fourth optical input signals into fourth optical output signals in accordance with the first optical encryption pattern;
  detecting at least one second radiometric and/or photometric quantity associated with the fourth optical output signals; and
  determining a second cryptographic key on the basis of the at least one detected second photometric quantity.

13. The method of claim 12, wherein the first and second cryptographic keys are identical.

14. A communication system for providing communication between third party devices and a controller employing a cryptography key distribution system according to claim 6.

15. The communication system of claim 14, wherein at least one of the first and second sources of electromagnetic radiation are an opto-electronic converter or modulator integrated in the third party device.

16. The communication system of claim 14, wherein at least one digital modulator is integrated in third party networks.

* * * * *